United States Patent
Algethami et al.

(10) Patent No.: US 12,485,072 B1
(45) Date of Patent: Dec. 2, 2025

(54) ECO-FRIENDLY AND BIOCOMPATIBLE HYBRID NANOMATERIALS IN SUNSCREEN

(71) Applicant: IMAM MOHAMMAD IBN SAUD ISLAMIC UNIVERSITY, Riyadh (SA)

(72) Inventors: Faisal Khuwayshan L. Algethami, Riyadh (SA); Sameera Shukir Mohammed Ameen, Zakho (IQ); Khalid Mohammad Omer, Sulaymaniyah (IQ)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/957,812

(22) Filed: Nov. 24, 2024

(51) Int. Cl.
*A61K 8/19* (2006.01)
*A61Q 17/04* (2006.01)

(52) U.S. Cl.
CPC ............ *A61K 8/19* (2013.01); *A61Q 17/04* (2013.01); *A61K 2800/26* (2013.01); *A61K 2800/413* (2013.01); *A61K 2800/52* (2013.01); *A61K 2800/591* (2013.01); *A61K 2800/612* (2013.01); *A61K 2800/651* (2013.01); *A61K 2800/82* (2013.01)

(58) Field of Classification Search
None
See application file for complete search history.

(56) References Cited

FOREIGN PATENT DOCUMENTS

| | | | | |
|---|---|---|---|---|
| CN | 106521674 B | | 4/2019 | |
| CN | 110251532 A | * | 9/2019 | .......... A61K 31/375 |
| CN | 108210347 B | | 4/2021 | |
| CN | 111154485 B | | 8/2022 | |
| CN | 1114372118 | | 2/2023 | |
| CN | 114766512 B | | 5/2023 | |
| JP | 2016122748 A | * | 7/2016 | |
| KR | 101701424 B1 | * | 2/2017 | |
| WO | WO-2009080427 A1 | * | 7/2009 | ............. A01N 25/04 |
| WO | WO-2018095442 A1 | * | 5/2018 | ............... A61K 8/19 |

OTHER PUBLICATIONS

Anu Sharma, et al., "Microencapsulated UV filter@ ZIF-8 based sunscreens for broad spectrum UV protection", RSC Advances, vol. 10, Sep. 15, 2020, pp. 34254-34260.

* cited by examiner

*Primary Examiner* — David J Blanchard
*Assistant Examiner* — Sarah J Chickos
(74) *Attorney, Agent, or Firm* — Oblon, McClelland, Maier & Neustadt, L.L.P.

(57) ABSTRACT

A sunscreen formulation includes carbon quantum dots having reacted units of citric acid and thiamine and particles of a metal-organic framework including zinc and reacted units of terephthalic acid. The sunscreen formulation further comprises a liquid carrier and a stabilizer. The quantum dots are dispersed in the metal-organic framework. The particles of the metal-organic framework are dispersed in the liquid carrier.

19 Claims, 6 Drawing Sheets

ECO-FRIENDLY AND BIOCOMPATIBLE HYBRID NANOMATERIALS IN SUNSCREEN

BACKGROUND

Technical Field

The present disclosure is directed to a sunscreen formulation, and particularly to hybrid nanomaterials comprising carbon quantum dots and a metal-organic framework in a sunscreen formulation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

A sunscreen is a topical formulation designed to protect skin from harmful ultraviolet (UV) radiation. Sunscreens may contain UV-filtering agents that absorb or reflect UV rays, preventing sunburn and reducing the risk of skin cancer. Despite being used for protection against harmful UV radiation, sunscreens have drawbacks affecting both their efficacy and safety. One concern is that many sunscreens do not provide comprehensive protection; while they may shield against UVB rays responsible for sunburn, they often offer inadequate defense against UVA rays, which penetrate deeper into the skin and contribute to premature aging and heightened skin cancer risk. Although broad-spectrum sunscreens attempt to address this issue, their effectiveness can still vary based on formulation and application.

Despite the widespread use of sunscreen, many users fail to achieve adequate UV protection due to insufficient coverage and degradation of active ingredients when exposed to environmental factors such as sunlight, water, and air. These issues can leave the skin vulnerable to UV damage, as sunscreen may not be applied consistently or in sufficient amounts, and the need for regular reapplication is often neglected. Additionally, some formulations can cause skin irritation, leading to improper use. As a result of improper use of sunscreen and/or improper sunscreen formulation, sunburn, premature aging, and skin cancer risks increase. Further, environmental degradation of sunscreen can contribute to pollution, particularly in aquatic ecosystems.

Another issue of sunscreen formulation revolves around the absorption of chemical ingredients, such as oxybenzone and octinoxate, into the bloodstream. These substances can penetrate the skin, potentially leading to hormonal disruptions and other health concerns. This has led to increased interest in mineral-based alternatives using physical blockers such as zinc oxide and titanium dioxide; however, these options are not without flaws, as they can leave an undesirable white cast on the skin, affecting user compliance.

Environmental impact of sunscreen usage is also a problem. Certain chemical components have been linked to detrimental effects on marine ecosystems, including coral bleaching. This has prompted legislative actions in places like Hawaii and Palau, where specific harmful ingredients have been banned to protect coral reefs and marine life. A growing demand for environmentally friendly or "reef-safe" sunscreens reflects increased public awareness, though standards and regulations for these products are still developing.

Use of nano-sized particles in mineral sunscreens raise safety and ecological concerns. Nanoparticles of zinc oxide and/or titanium dioxide may be employed to minimize visible residue of mineral sunscreen on the skin, enhancing cosmetic appeal; however, concerns persist regarding their potential to penetrate skin barriers and accumulate in aquatic environments, posing risks to both human health and wildlife health.

Overall, while sunscreens play a large role in safeguarding skin health, their effectiveness is often compromised by issues like improper coverage, degradation under environmental exposure, and inconsistent user application. Health and environmental concerns associated with certain active ingredients underscore the need for ongoing innovation, improved formulations, and increased public education to establish sunscreen products are both safe and effective for widespread use.

Accordingly, an object of the present disclosure is to develop an effective and reliable sunscreen formulation comprising hybrid nanomaterials comprising carbon quantum dots and a metal-organic framework that utilizes safe and effective components and offers UV protection, good dispersion, and enhanced safety that may overcome shortcomings of the art.

SUMMARY

In an exemplary embodiment, a sunscreen formulation is described. The sunscreen formulation includes carbon quantum dots having reacted units of citric acid and thiamine and particles of a metal-organic framework including zinc and reacted units of terephthalic acid. The sunscreen formulation includes a liquid carrier and a stabilizer. The carbon quantum dots are dispersed in the metal-organic framework. The framework particles of the metal-organic framework are dispersed in the liquid carrier.

In some embodiments, the liquid carrier is selected from a group consisting of paraffin, mineral oil, beeswax, paraffin wax, sunflower oil, apricot kernel oil, shea butter, jojoba oil, dimethicone, cyclomethicone, cetyldimethicone, xanthan gum, water, glycerin, and aloe vera.

In some embodiments, the stabilizer is selected from a group consisting of C12-15 alkyl benzoate, isododecane, styrene/acrylates copolymer, glyceryl stearate, butyloctyl salicylate, dicaprylyl carbonate, propanediol, stearic acid, PEG-100 stearate, sorbitan stearate, PEG-8 laurate, and sodium lauroyl lactylate.

In some embodiments, the carbon quantum dots are made by a method including dissolving citric acid and thiamine in water to form a first solution, sonicating the first solution, adding a base to the first solution, heating the first solution to a temperature of 140 to 180° C. for 4 to 6 hours to form particles, suspending the particles in a liquid to form a second solution, centrifuging the second solution, and collecting a supernatant that includes the carbon quantum dots.

In some embodiments, a weight ratio of the citric acid to the thiamine is from 0.1:1 to 1:1.

In some embodiments, the method includes sonicating the first solution for 10 to 30 minutes.

In some embodiments, the method includes centrifuging the second solution at a speed of 6000 to 8000 revolutions per minutes (rpms) for 20 to 40 minutes.

In some embodiments, the process of making the carbon quantum dots further includes dialyzing the supernatant against water for 20 to 28 hours.

In some embodiments, the metal-organic framework is made by a process including mixing a zinc salt, terephthalic acid, and a base in aqueous methanol to form a solution and heating the solution to a temperature of 130 to 150° C. for 16 to 24 hours to form the metal-organic framework.

In some embodiments, a molar ratio of the zinc salt to the terephthalic acid is from 1:1 to 1:3.

In some embodiments, the aqueous methanol includes methanol in an amount of 40 to 60 percent by volume.

In some embodiments, the method includes heating the first solution in an autoclave.

In some embodiments, the metal-organic framework is the shape of spherical particles with an average diameter of 2 to 10 nanometer (nm).

In some embodiments, the metal-organic framework is the shape of spherical particles with an average diameter of 4 to 8 nm.

In some embodiments, the formulation has an ultraviolet (UV) absorbance of at least 80% in a range of 50 to 500 nm.

In some embodiments, the formulation has an UV absorbance of at least 80% in a range 100 to 400 nm.

In some embodiments, the carbon quantum dots absorb ultraviolet A (UVA) radiation.

In some embodiments, the carbon quantum dots absorb ultraviolet B (UVB) radiation.

In some embodiments, the carbon quantum dots absorb UVA and UVB radiation.

In an exemplary embodiment, a method of ultraviolet light protection is described. The method includes contacting the sunscreen formulation with skin of a subject and irradiating the skin of the subject with the sunscreen formulation present on the skin. The carbon quantum dots in the sunscreen formulation absorb the ultraviolet light.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
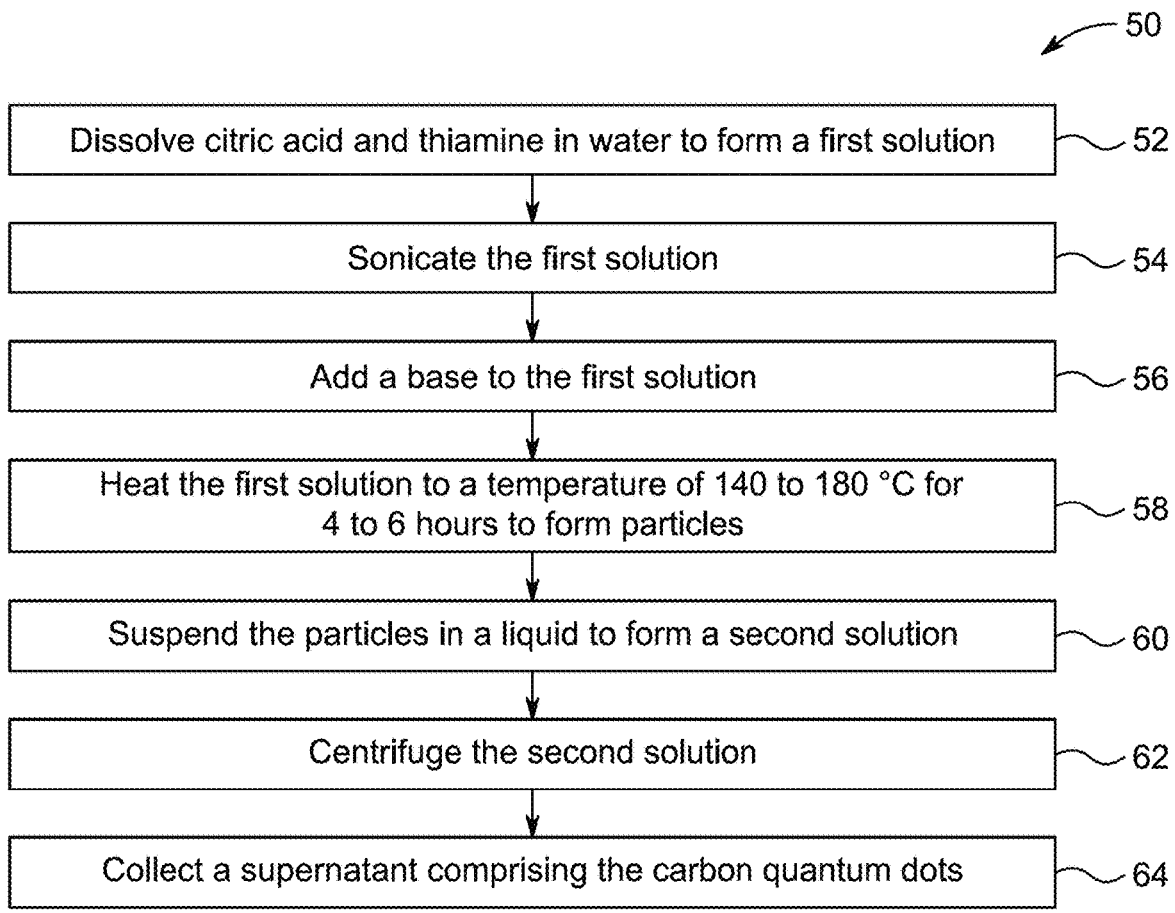
FIG. 1A is a flowchart depicting a method of making carbon quantum dots (CQDs), according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or like reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween. Within the description of this disclosure, where a numerical limit or range is stated, the endpoints are included unless stated otherwise. Also, all values and subranges within a numerical limit or range are specifically included as if explicitly written out.

Aspects of the present disclosure are directed to a sunscreen formulation. The sunscreen formulation includes carbon quantum dots (CQDs), particles of a metal-organic framework, a liquid carrier including the CQDs and the metal-organic framework, and a stabilizer to maintain the sunscreen formulation. The CQDs function as a UV absorber and shield the skin from UV rays. The particles of the metal-organic framework function as a dispersing agent by promoting an even spread of the UV absorber on the skin, preventing clumping and promoting consistent protection, and the stabilizer helps maintain the longevity and effectiveness of the sunscreen formulation under various environmental conditions.

Carbon quantum dots (CQDs), also referred to herein as carbon dots (CDs) and/or quantum dots (QDs), are nanometer-sized carbon particles with various optical properties, such as photoluminescence. Their application in sunscreen formulation offers benefits, such as UV protection, biocompatibility, antioxidant properties, stability, durability, enhanced photostability, and the like. The CQDs of the present disclosure include substances that can effectively absorb UV radiation, preferably UVA radiation (320-400 nm), UVB radiation (290-320 nm), and a combination of both UVA and UVB radiation. In an embodiment, the CQDs can absorb radiation in a range of 50-500 nm, preferably 75-450 nm, and preferably 100-400 nm. In some embodiments, at least 80%, preferably at least 85%, preferably at least 90%, preferably at least 95%, and preferably at least 99%, of radiation is absorbed in a range of 50-500 nm.

The CQDs of the present disclosure include reacted units of citric acid and reacted units of thiamine. In some embodiments, the weight ratio of the citric acid to the thiamine is from 0.1:1 to 1:1, preferably 0.2: to 0.9:1, preferably 0.3:1 to 0.8:1, preferably 0.4:1 to 0.7:1, and preferably 0.5:1 to 0.6:1. Citric acid is used as a precursor in CQD synthesis due to its rich carbon content and ability to undergo polymerization and carbonization, thereby helping form the carbon core of the CQDs. In some embodiments, other carbon-containing acids, such as lactic acid, acetic acid, formic acid, tartaric acid, and the like, may be used in place of or in combination with the citric acid. The reacted units of citric acid may have undergone chemical modification and/or reactions to improve its chemical properties and/or to allow citric acid to bond and/or interact with the reacted units of thiamine to form the carbon quantum dots.

As used herein, the "reacted units of thiamine" refers to forms of thiamine that have undergone some chemical modification and/or reaction. The reacted units of thiamine may have undergone chemical modification and/or reactions to improve its chemical properties and/or to allow thiamine to bond, preferably via a covalent bond, and/or interact with the reacted units of citric acid to form the carbon quantum dots. Thiamine, also known as vitamin $B_1$, can exist in different forms, such as thiamine monophosphate (TMP), thiamine diphosphate (TDP), thiamine pyrophosphate (TPP), thiamine triphosphate, thiamine hydrochloride, and the like. In some embodiments, derivatives of thiamine and/or other B vitamins, which may absorb UV radiation, may be used in place of or in combination with thiamine and/or reacted units of thiamine.

Thiamine, or its reacted units, include thiazole and pyrimidine rings, which contribute to nitrogen and sulfur doping in CQDs and may enhance optical and electronic properties of the resulting quantum dots. At specific reaction conditions, the combination of reacted units of citric acid and reacted units of thiamine undergo carbonization, leading to the production of CQDs. The CQDs prepared combine beneficial properties of both precursors: a strong carbon backbone from citric acid and enhanced nitrogen/sulfur doping from thiamine. This results in the formation of CQDs that may function as a UV absorber when used in the sunscreen formulation.

The sunscreen formulation of the current disclosure also includes particles of a metal-organic framework (MOF), including zinc and reacted units of terephthalic acid. Zinc-based MOFs incorporating terephthalic acid may be used as UV filters and/or dispersion agents for sunscreen applications. The UV diffuse reflectance of zinc-based MOFs incorporating terephthalic acid is higher than conventionally used titanium dioxide ($TiO_2$) and/or zinc oxide (ZnO), effectively protecting against harmful UV radiation. Terephthalic acid acts as a ligand in forming the MOFs, contributing to their structural stability and the symmetrical structure of terephthalic acid results in the creation of pore channels within the MOF. This enhances its ability to scatter and reflect UV light effectively. In some embodiments, the MOF is in the shape of spherical particles with an average diameter of 2 to 10 nm, preferably 3 to 9 nm, more preferably 4 to 8 nm, and yet more preferably about 6 nm. In other embodiments, the MOF may be in the shape of cubic particles, rectangular particles, cylindrical particles, hexagonal particles, a combination thereof, and any other particle shape known in the art.

The quantum dots are dispersed in the metal-organic framework. In some embodiments, the quantum dots may be dispersed in and/or on a surface of the metal-organic framework. In some embodiments, the quantum dots may interact with the metal-organic framework through intermolecular forces, such as hydrogen bonding, dipole-dipole forces, Van der Waals forces, a combination thereof, and the like. The particles of the metal-organic framework are dispersed in the liquid carrier. In some embodiments, the metal-organic framework may interact with the liquid carrier through intermolecular forces, such as hydrogen bonding, dipole-dipole forces, Van der Waals forces, a combination thereof, and the like. The liquid carrier is one factor that affects the stability and application of the sunscreen formulation. It helps to ensure the sunscreen is spreadable, stable, and effective when applied on a subject. Common liquid carriers include water, silicone oils, glycerin, natural oils, and alcohol, depending on the type and function of the sunscreen. In some embodiments, the liquid carrier includes, but is not limited to, paraffin, mineral oil, beeswax, paraffin wax, sunflower oil, apricot kernel oil, shea butter, jojoba oil, dimethicone, cyclomethicone, cetyldimethicone, xanthan gum, water, glycerin, aloe vera, and a combination thereof. In some embodiments, any liquid carrier known in the art may be used in the sunscreen formulation. In some embodiments, a solid carrier may be used in combination with or in place of the liquid carrier.

The sunscreen formulation further includes a stabilizer. A stabilizer is an ingredient or additive to maintain a sunscreen formulation and promote effectiveness during use, especially when exposed to environmental factors like sunlight and heat. Common stabilizers include antioxidants, silicones, emulsifiers, and UV stabilizers like octocrylene, which prevent the degradation of UV filters. In an embodiment, stabilizers are selected from, but are not limited to, C12-15 alkyl benzoate, isododecane, styrene/acrylates copolymer, glyceryl stearate, butyloctyl salicylate, dicaprylyl carbonate, propanediol, stearic acid, PEG-100 stearate, sorbitan stearate, PEG-8 laurate, sodium lauroyl lactylate, and a combination thereof. In some embodiments, any stabilizer known in the art may be used in the sunscreen formulation.

Referring to FIG. 1A, a method 50 of preparing carbon quantum dots (CQDs) is described. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes dissolving citric acid and thiamine in water to form a first solution. Citric acid is a carbon precursor, while thiamine contains nitrogen (from the amine group in its structure) and sulfur (from its thiazole ring), making it a dopant for CQDs. In some embodiments, a weight ratio of the citric acid to the thiamine in the first solution is from 0.1:1 to 1:1, preferably 0.2:1 to 0.9:1, preferably 0.3:1 to 0.8:1, preferably 0.4:1 to 0.7:1, more preferably 0.5:1 to 0.6:1, and yet more preferably about 0.6:1. In some embodiments, solvents other than water may be used in combination with or in place of water to dissolve the citric acid and thiamine. In some embodiments, other acids, such as lactic acid, acetic acid, formic acid, tartaric acid, a combination thereof, and the like may be used as carbon precursors.

At step 54, the method 50 includes sonicating the first solution. Sonication is carried out to facilitate dissolution of citric acid and thiamine in water. In some embodiments, other methods conventionally known in the art, such as heating, mixing, stirring, shaking, and the like, may be employed to dissolve thiamine and citric acid in the first solution. In some embodiments, sonication is a preferred method because thiamine is sensitive to heat and light. Choosing a harsh method, such as heating or heavy agitation, may affect the stability of thiamine. Mild conditions employed during sonication may help maintain the stability of thiamine in comparison to other traditional heating methods employed for dissolution of individual components in the first solution. In some embodiments, sonication occurs for 10-30 minutes, preferably 15-25 minutes, and more preferably about 20 minutes, to promote dissolution of citric acid and thiamine in the first solution without compromising stability.

At step 56, the method 50 includes adding a base to the first solution. Adding a base increases solubility of the reactants, enhances mixing, and forming a more homogeneous solution, resulting in more uniform CQDs. Suitable examples of bases that can adjust the pH of the first solution include, but are not limited to, sodium hydroxide (NaOH), potassium hydroxide (KOH), ammonia ($NH_3$), a combination thereof, other alkaline compounds, and the like. In a preferred embodiment, the base is NaOH. In some embodiments, the pH is adjusted to above 7 (alkaline conditions), although it is preferred to maintain a pH range of 8-11. This range may be altered depending on the desired properties of the CQDs.

At step 58, the method 50 includes heating the first solution to a temperature of 140 to 180° C., preferably 145 to 175° C., preferably 150 to 170° C., more preferably 155 to 165° C., and yet more preferably about 160° C. for 4 to 6 hours, preferably 4.5 to 5.5 hours, and more preferably about 5 hours to form particles. In some embodiments, the heating occurs in an autoclave. In some embodiments, the mixture is subjected to hydrothermal heating (typically at 140-180° C.) for a few hours.

At step 60, the method 50 includes suspending the particles in a liquid to form a second solution. In a preferred embodiment, the liquid is water. In some embodiments, the liquid may be any liquid known in the art. Following the hydrothermal heating process, the reaction vessel is allowed to cool to room temperature. This can happen naturally or by placing the reaction vessel in an ice bath or other methods known in the art to speed up the cooling process. Once cooled, the liquid will contain CQDs and may be contain some impurities and/or unreacted materials.

At step 62, the method 50 includes centrifuging the second solution. This is carried out to separate the CQDs from other unreacted materials/precursors and/or precipitates and impurities that may have formed during the reaction. The centrifugation is carried out at 6000 to 8000 rpm, preferably 6200 to 7800 rpm, preferably 6400 to 7600 rpm, preferably 6600 to 7400 rpm, more preferably 6800 to 7200 rpm, and yet more preferably about 7000 rpm, for 20 to 40 minutes, preferably 22 to 38 minutes, preferably 24 to 36 minutes, preferably 26 to 34 minutes, more preferably 28 to 32 minutes, and yet more preferably about 30 minutes. After centrifugation, a separation may be observed between the supernatant (containing the CQDs) on the top of the centrifuging vessel and the unreacted materials/precursors or precipitates at the bottom of the centrifuging vessel.

At step 64, the method 50 includes collecting a supernatant comprising the carbon quantum dots. In some embodiments, the supernatant is purified optionally using techniques like dialysis to remove any remaining impurities or unreacted precursors. The supernatant containing CQDs can be dialyzed using a dialysis membrane to remove the remaining impurities or unreacted precursors. The method of performing dialysis is obvious to a person skilled in the art. In a specific embodiment, the method includes dialyzing the supernatant against water for 20 to 28 hours, preferably 22 to 26 hours, more preferably 23 to 25 hours, and yet more preferably about 24 hours. In some embodiments, the CQDs obtained after purification can be stored at about 4° C. to prevent degradation while ensuring the solution is free of microbial contamination before use.

Figure 1B:
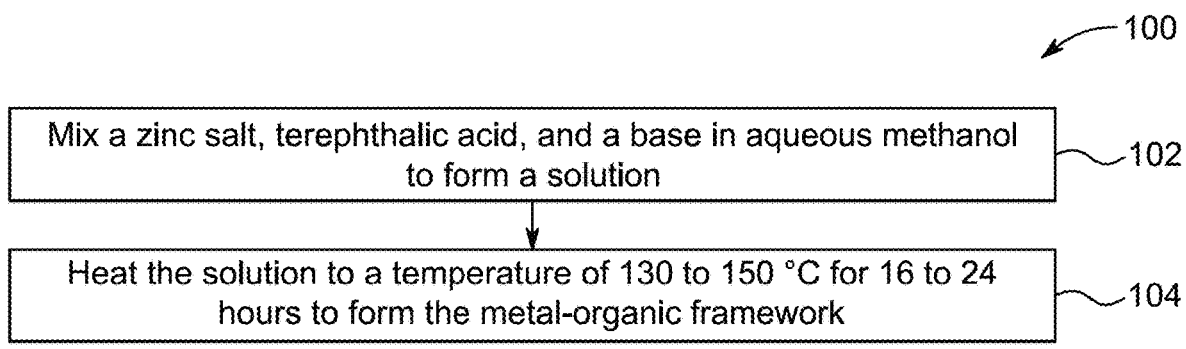
FIG. 1B is a flowchart depicting a method of making a metal-organic framework (FMOF-5), according to certain embodiments.
Figure 2:
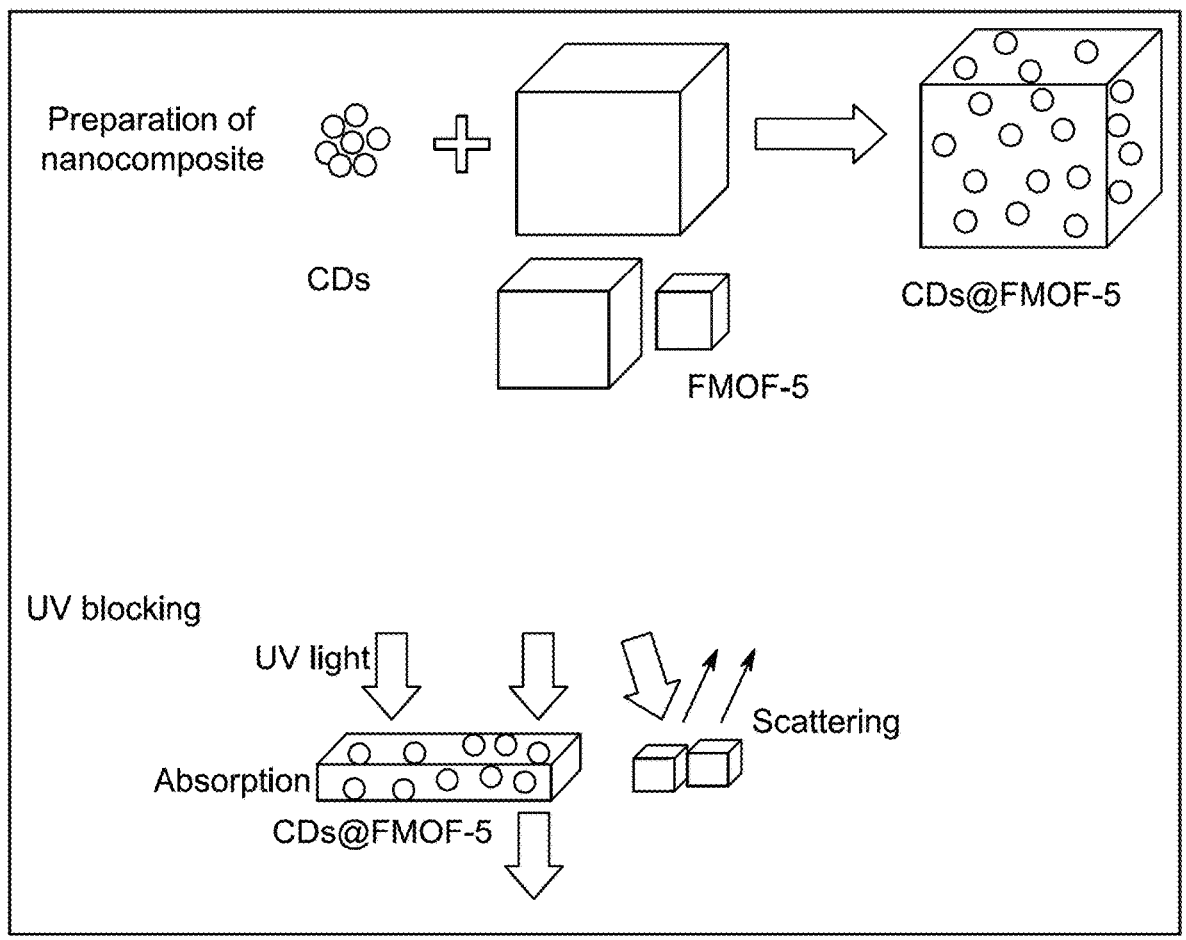
FIG. 2 is a schematic illustration depicting the preparation of the sunscreen formulation and its mechanism in blocking ultraviolet (UV) light when applied to a subject, according to certain embodiments.

Referring to FIG. 1B, a method 100 of making a metal-organic framework, is described. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing a zinc salt, terephthalic acid, and a base in aqueous methanol to form a solution. Suitable examples of zinc salts include, but are not limited to, zinc sulfate, zinc nitrate, zinc chloride, zinc acetate, zinc carbonate, and/or combinations thereof, and the like. In a preferred embodiment, the zinc salt is zinc acetate. The molar ratio of the zinc salt to the terephthalic acid is 1:1 to 1:3, preferably 1:1.5 to 1:2.5, and more preferably about 1:2. The zinc salt and the terephthalic acid are mixed in a base. Suitable examples of bases include, but are not limited to, lithium hydroxide (LiOH). sodium hydroxide (NaOH), potassium hydroxide (KOH), rubidium hydroxide (RbOH), magnesium hydroxide ($Mg(OH)_2$), barium hydroxide ($Ba(OH)_2$), calcium hydroxide ($Ca(OH)_2$), strontium hydroxide ($Sr(OH)_2$), and/or combinations thereof, and the like. In a preferred embodiment, the base is sodium hydroxide. In some embodiments, the molar ratio of the terephthalic acid to the base is in the range of 20:1 to 1:1, preferably 15:1 to 2:1, preferably 12:1 to 3:1, preferably 10:1 to 4:1, more preferably 7:1 to 5:1, and yet more preferably about 5:1. In a preferred embodiment, the molar ratio of the terephthalic acid to the base is 5:1. The zinc salt, terephthalic acid, and the base are dissolved in aqueous methanol. The aqueous methanol includes methanol in an amount of 40 to 60 percent by volume (v/v %), preferably 42 to 58 v/v %, preferably 44 to 56 v/v %, preferably 46 to 54 v/v %, more preferably 48 to 52 v/v %, and yet more preferably about 50%. In a preferred embodiment, all the reactants are stirred for about 10-60 minutes, preferably 15-50 minutes, preferably 20-40, more preferably 25-35 minutes, and yet more preferably about 30 minutes, to promote dissolution of the reactants in the aqueous methanol to form the solution.

At step 104, the method 100 includes heating the solution to 130 to 150° C., preferably 135 to 145° C., and more preferably about 140° C. for 16 to 24 hours, preferably 18 to 22 hours, and more preferably about 20 hours to form the metal-organic framework. In some embodiments, the heating occurs in an autoclave. In some embodiments, the solution is subjected to hydrothermal heating. In some embodiments, the metal-organic framework may be further washed with a solvent, preferably methanol, to remove impurities and then dried using a heating appliance, preferably an oven.

According to another aspect of the present disclosure, a method of ultraviolet light protection is described. The method includes contacting the sunscreen formulation with the skin of a subject. In some embodiments, the subject is a mammal, preferably a human. In this method, an effective amount of the sunscreen formulation may be applied topically on the skin (for example, lips, face, arms, scalp, and the like). The sunscreen composition may be topically applied in any manner known in the art, including by spray application, wiping, laying, spreading, and/or rubbing with hands or an applicator, such as a spray bottle, wipe, roller, and the like. In certain embodiments, an effective amount may range, for example, from about 0.5 mg/cm$^2$ to about 5 mg/cm$^2$, preferably from about 1 mg/cm$^2$ to about 3 mg/cm$^2$, or preferably about 2 mg/cm$^2$. In some embodiments, after contacting the subject's skin with the sunscreen formulation, the skin is dried, preferably air-dried, for 5 seconds to 10 minutes, preferably 10 seconds to 5 minutes, preferably 30 seconds to 2 minutes, or preferably about 1 minute. In some embodiments, the sunscreen formulation may be applied to the skin 1 to 30 minutes, preferably 2 to 25 minutes, preferably 5 to 20 minutes, and more preferably about 10 to 15 minutes before irradiation of the skin with light. In some embodiments, irradiation may occur via sunlight, ultraviolet light, and any other light sources known in the art. When the skin of the subject is irradiated with light, the carbon quantum dots present in the sunscreen formulation absorb and the ultraviolet light. In some embodiments, the sunscreen formulation of the present disclosure has an ultraviolet (UV) absorbance of at least 80%, preferably at least 85%, preferably at least 90%, preferably at least 95%, and preferably at least 99% in a range of 50 to 500 nm, preferably in the range 100 to 400 nm. In some embodiments, the carbon quantum dots present in the sunscreen formulation absorb ultraviolet A (UVA) radiation. In some embodiments, the carbon quantum dots present in the sunscreen formulation absorb ultraviolet B (UVB) radiation. In some embodiments, the carbon quantum dots present in the sunscreen formulation absorb UVA radiation and UVB radiation. In some embodiments, the carbon quantum dots present in the sunscreen formulation scatter ultraviolet light. In other embodiments, the carbon quantum carbon dots present in the sunscreen formulation scatter and absorb ultraviolet light.

EXAMPLES

The disclosure will now be illustrated with working examples, which are intended to illustrate the working of the disclosure and not intended to restrictively imply any limitations on the scope of the present disclosure, as many variations thereof are possible without departing from the spirit and scope of the present disclosure. The following examples demonstrate a sunscreen formulation. The examples are provided solely for illustration and are not to be construed as limitations of the present disclosure, as many variations thereof are possible without departing from the spirit and scope of the present disclosure.

Example 1: Preparation of Carbon Quantum Dots (CQDs)

The CQDs were prepared using a facile hydrothermal method. In brief, 0.6 grams (g) of citric acid and 1.0 g of thiamine (vitamin B$_1$) were dissolved in 25.0 milliliters (mL) ultra-pure water, then the mixture was sonicated for 20 minutes to obtain a transparent solution. The pH of the mixture was adjusted with NaOH solution to make the medium neutral or slight alkaline. Subsequently, the solution was transferred into a reactor and subjected to heating at 160° C. for a duration of 5 hours, followed by cooling to room temperature. In order to remove larger particles, a brownish suspension was centrifuged at 7000 revolutions per minute (rpm) for a duration of 30 minutes. Subsequently, the suspension underwent dialysis against ultra-pure water using a dialysis membrane for a period of 24 hours. Finally, the resulting solution of the product was refrigerated at 4° C. for future use and characterization purposes.

Example 2: Preparation of the Metalorganic Framework (FMOF-5)

For the preparation of FMOF-5, a single-step solvothermal method was used. Initially, Zn(CH$_3$COO)$_2$·2H$_2$O (1.0 mmol), terephthalic acid (TPA; 2.0 mmol), and NaOH (0.4 mmol) were mixed and dissolved in 40 mL aqueous solution of methanol (50 v/v %). Following a 30-minute stirring period, the mixture was transferred to a Teflon-lined autoclave reactor and heated at 140° C. for 20 hours. The resultant FMOF-5, appearing as white powder, underwent multiple washes with 50 v/v % methanol and was subsequently dried in an oven.

Figure 3A:
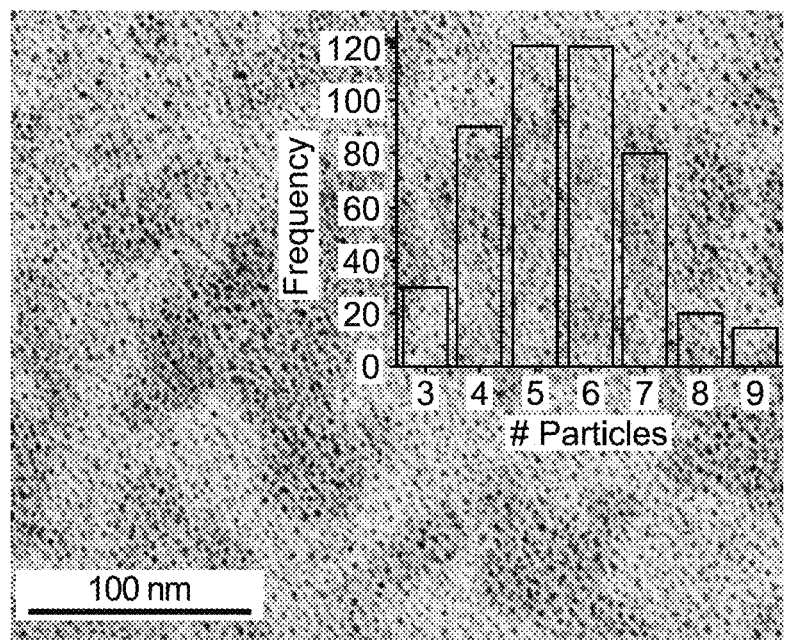
FIG. 3A depicts a transmission electron microscopy (TEM) image and histogram of FMOF-5, according to certain embodiments.

Various characterization techniques were used to investigate the prepared FMOF-5 particles, measuring their size, shape, and optical properties. Regarding size and shape, transmission electron microscopy (TEM) imaging was used. As shown in FIG. 3A, the TEM image shows uniform spherical nanoparticles with an approximate size distribution of 6±2 nanometer (nm) (in the range of nanodots), the inset of FIG. 3A illustrates a histogram depicting a range of nanoparticles from 4-8 nm and a relatively monodisperse nature of the particles.

Figure 3B:
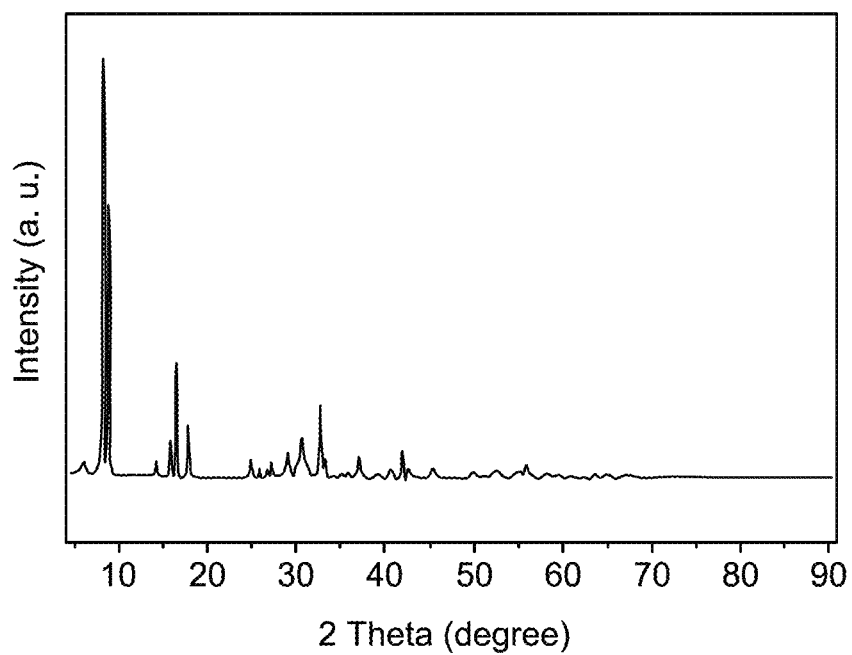
FIG. 3B depicts an X-ray diffraction (XRD) pattern of the FMOF-5, according to certain embodiments.

The powder X-ray diffraction (PXRD) pattern of FMOF-5, as seen in FIG. 3B, shows peak positions and characteristic peaks consistent with the simulated PXRD pattern of MOF-5 [Rather, R. A. and Siddiqui, Z. N., Silver Phosphate Supported on Metal-Organic Framework (Ag$_3$PO$_4$@MOF-5) as a Novel Heterogeneous Catalyst for Green Synthesis of Indenoquinolinediones, *Appl. Organomet. Chem.*, 2019, 33, 11, 1-14, which is incorporated herein by reference in its entirety]. The PXRD pattern confirms the successful synthesis of FMOF-5 through a one-step synthesis method, validating its crystalline structure.

Figure 3C:
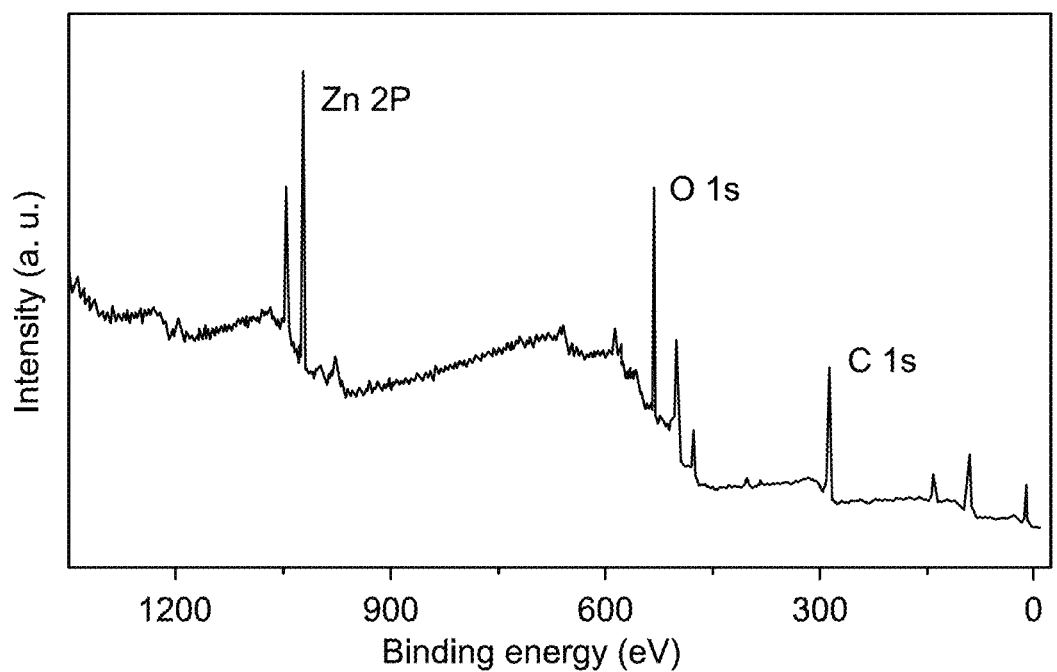
FIG. 3C depicts an X-ray photoelectron spectroscopy (XPS) spectrum of zinc (Zn), carbon (C), and oxygen (O) in FMOF-5, according to certain embodiments.
Figure 3D:
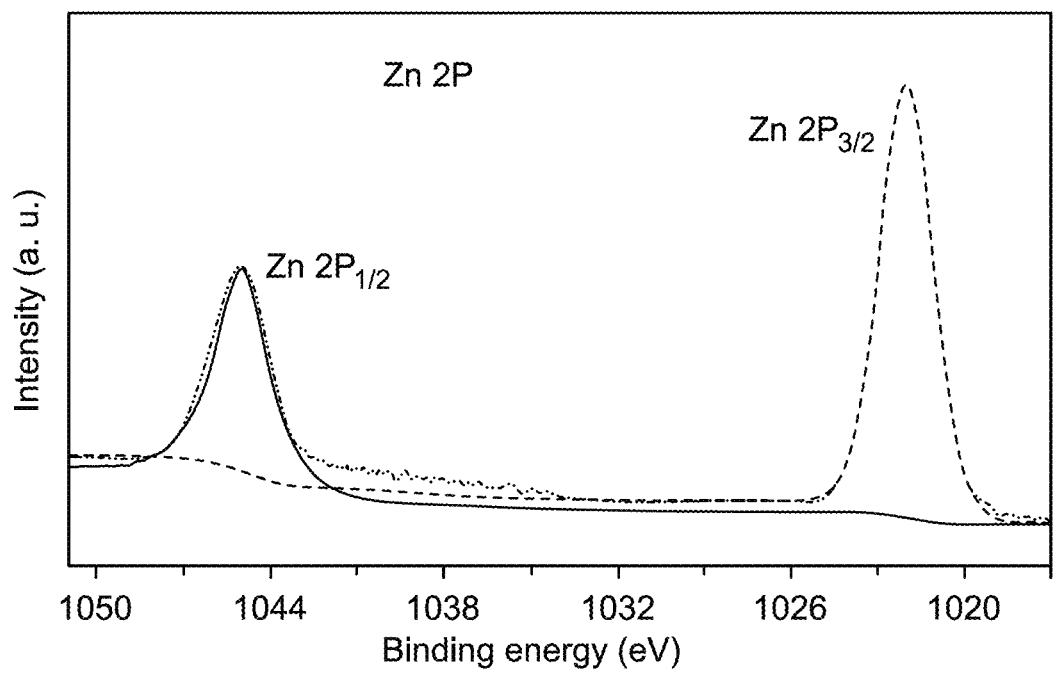
FIG. 3D depicts XPS spectra of Zn 2p in FMOF-5, according to certain embodiments.
Figure 3E:
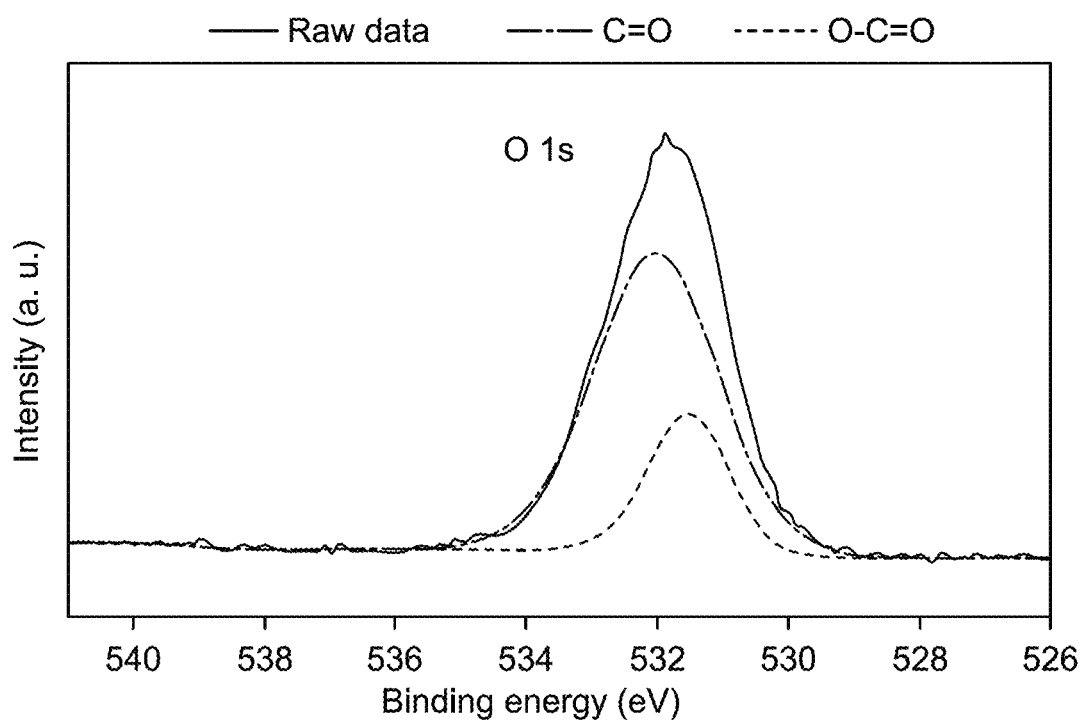
FIG. 3E depicts XPS spectra of O 1 s in FMOF-5, according to certain embodiments.
Figure 3F:
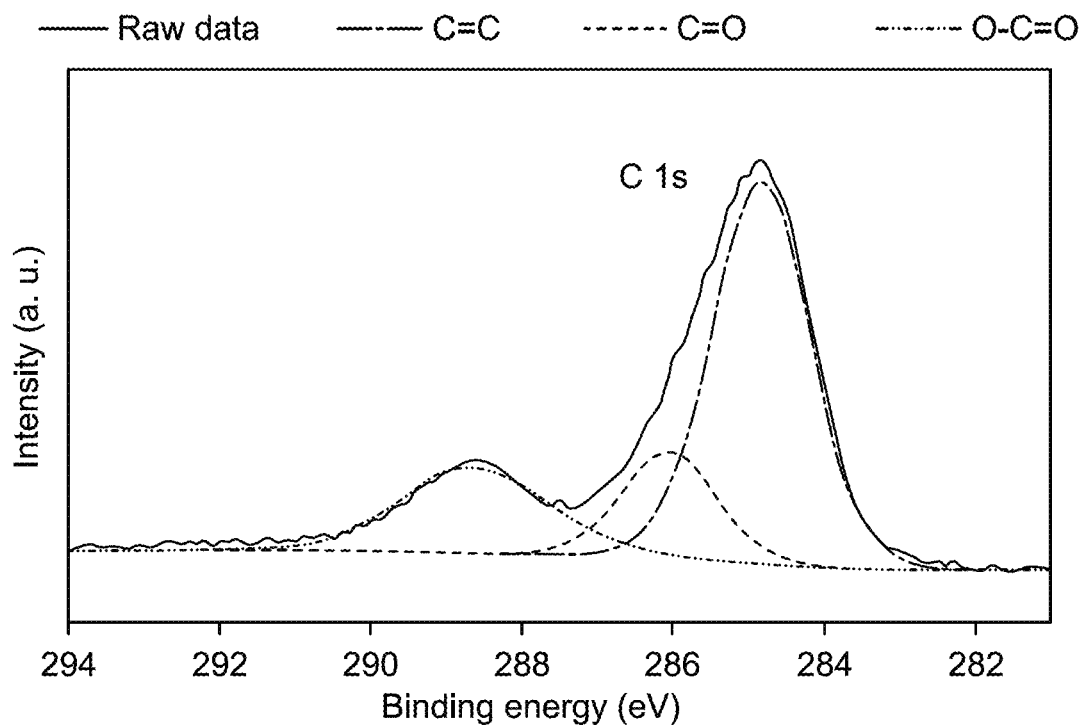
FIG. 3F depicts XPS spectra of C 1 s in FMOF-5, according to certain embodiments.
Figure 3G:
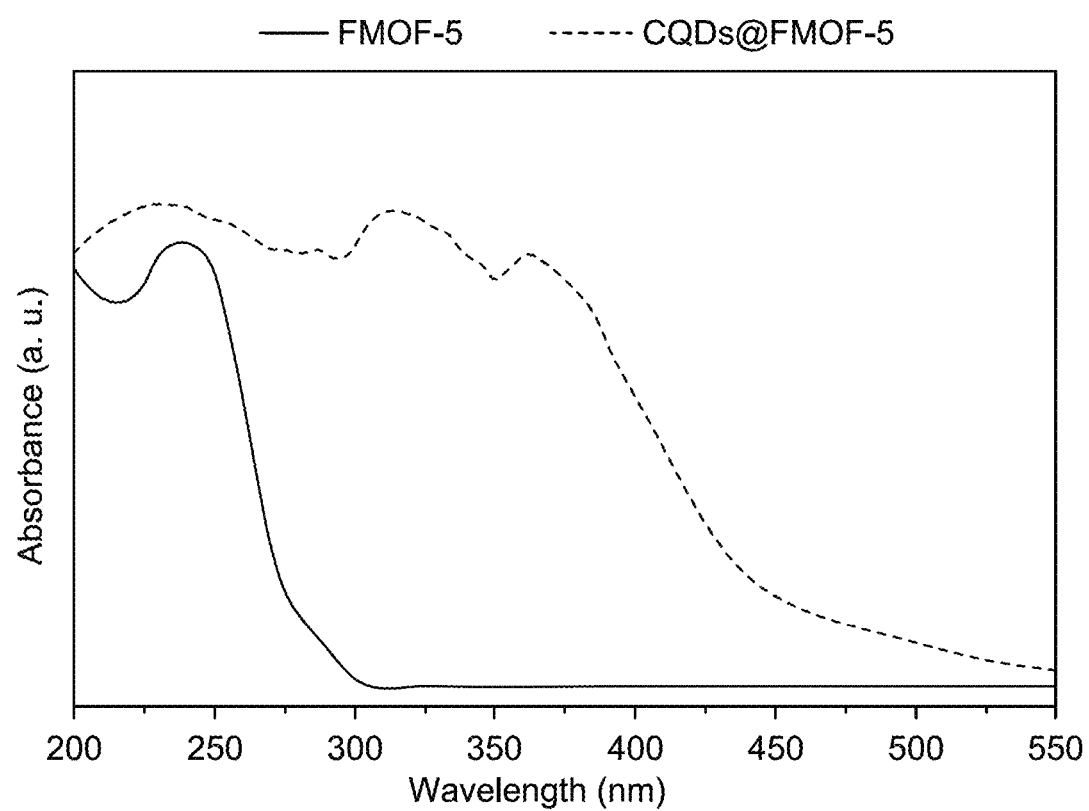
FIG. 3G depicts ultraviolet-visible (UV-vis) spectra of FMOF-5 and the sunscreen formulation, according to certain embodiments.

The chemical composition and oxidation state of FMOF-5 were investigated by X-ray photoelectron spectroscopy (XPS), as seen in FIGS. 3C-3F. FIG. 3C is a survey spectrum that shows the elements of zinc (Zn), carbon (C), and oxygen (O) exist in FMOF-5. As shown in FIG. 3D, the Zn 2p deconvoluted XPS spectra show two characteristic peaks at 1045.18 and 1021.78 eV, which may be attributed to Zn 2p$_{1/2}$ and Zn 2p$_{3/2}$, respectively [Kumar, G. and Masram, D. T., Sustainable Synthesis of MOF-5@GO Nanocomposites for Efficient Removal of Rhodamine B from Water, *ACS Omega*, 2021, 6, 14, 9587-9599, which is incorporated herein by reference in its entirety]. The XPS spectra peaks of O 1 s at 531.89 and 531.28 eV (FIG. 3E) were attributed to the C=O and O—C=O bonds, respectively, in the FMOF-5 [Kumar, G. and Masram, D. T., Sustainable Synthesis of MOF-5@GO Nanocomposites for Efficient Removal of Rhodamine B from Water, *ACS Omega*, 2021, 6, 14, 9587-9599, which is incorporated herein by reference in its entirety]. The XPS signals of C 1 s at 285.08, 286.08, and 288.58 eV (FIG. 3F) were attributed to C=C, C=O, and O—C=O bonds, respectively, in the FMOF-5 [Chul, H. D. et al., Effect of the Cobalt and Zinc Ratio on the Preparation of Zeolitic Imidazole Frameworks (ZIFs): Synthesis, Characterization and Supercapacitor Applications, *Dalt. Trans.*, 2019, 48, 39, 14808-14819, which is incorporated herein by reference in its entirety].

The present disclosure presents a sunscreen formulation including three components. The first component (carbon quantum dots) is a powerful biocompatible UV light absorber that promotes protection against harmful ultraviolet radiation from 100-400 nm. The second component is designed as a 3D network hybrid material (metal-organic framework (MOF)) to disperse the UV blockers across the skin, promoting consistent coverage and enhancing the overall effectiveness of the sunscreen. The third component (stabilizer) provides stability to the UV blockers, maintaining their protective properties even under harsh environmental conditions. The sunscreen formulation of the present disclosure offers UV protection, good dispersion, and enhanced sun safety, making it an effective and reliable sunscreen solution.

Numerous modifications and variations of the present disclosure are possible in light of the above teachings. It is therefore to be understood that within the scope of the appended claims, the disclosure may be practiced otherwise than as specifically described herein.

The invention claimed is:

1. A sunscreen formulation, comprising:
   carbon quantum dots comprising reacted units of citric acid and reacted units of thiamine, wherein a weight ratio of the citric acid to the thiamine is from 0.4:1 to 0.7:1;
   particles of a metal-organic framework comprising zinc and reacted units of terephthalic acid, wherein the metal-organic framework comprises F-MOF5, and the F-MOF5 comprises spherical particles having an average diameter of 4 to 8 nm;
   a liquid carrier, and
   a stabilizer,
   wherein the carbon quantum dots are dispersed in the metal-organic framework, and
   wherein the particles of the metal-organic framework are dispersed in the liquid carrier.

2. The sunscreen formulation of claim 1, wherein the liquid carrier is selected from a group consisting of paraffin, mineral oil, beeswax, paraffin wax, sunflower oil, apricot kernel oil, shea butter, jojoba oil, dimethicone, cyclomethicone, cetyldimethicone, xanthan gum, water, glycerin, and aloe vera.

3. The sunscreen formulation of claim 1, wherein the stabilizer is selected from a group consisting of C12-15 alkyl benzoate, isododecane, styrene/acrylates copolymer, glyceryl stearate, butyloctyl salicylate, dicaprylyl carbonate, propanediol, stearic acid, PEG-100 stearate, sorbitan stearate, PEG-8 laurate, and sodium lauroyl lactylate.

4. The sunscreen formulation of claim 1, wherein the carbon quantum dots are made by a process comprising:
   dissolving citric acid and thiamine in water to form a first solution;
   sonicating the first solution;
   adding a base to the first solution;
   heating the first solution to a temperature of 140 to 180° C. for 4 to 6 hours to form particles;
   suspending the particles in a liquid to form a second solution;
   centrifuging the second solution; and
   collecting a supernatant comprising the carbon quantum dots.

5. The sunscreen formulation of claim 4, wherein a weight ratio of the citric acid to the thiamine is from 0.5:1 to 0.6:1.

6. The sunscreen formulation of claim 4, wherein the sonicating occurs for 10 to 30 minutes.

7. The sunscreen formulation of claim 4, wherein the centrifuging occurs at a speed of 6000 to 8000 rpms for 20 to 40 minutes.

8. The sunscreen formulation of claim 4, wherein the process of making the carbon quantum dots further comprises:
   dialyzing the supernatant against water for 20 to 28 hours.

9. The sunscreen formulation of claim 1, wherein the metal-organic framework is made by a process comprising:
   mixing a zinc salt, terephthalic acid, and a base in aqueous methanol to form a solution; and
   heating the solution to a temperature of 130 to 150° C. for 16 to 24 hours to form the metal-organic framework.

10. The sunscreen formulation of claim 9, wherein a molar ratio of the zinc salt to the terephthalic acid is from 1:1 to 1:3.

11. The sunscreen formulation of claim 9, wherein the aqueous methanol comprises methanol in an amount of 40 to 60 percent by volume.

12. The sunscreen formulation of claim 9, wherein the heating occurs in an autoclave.

13. The sunscreen formulation of claim 1, wherein the metal-organic framework is the shape of spherical particles with an average diameter of 2 to 10 nm.

14. The sunscreen formulation of claim 1, wherein the formulation has an ultraviolet (UV) absorbance of at least 80% in a range of 50 to 500 nm.

15. The sunscreen formulation of claim 1, wherein the formulation has an ultraviolet (UV) absorbance of at least 80% in a range 100 to 400 nm.

16. The sunscreen formulation of claim 1, wherein the carbon quantum dots absorb UVA radiation.

17. The sunscreen formulation of claim 1, wherein the carbon quantum dots absorb UVB radiation.

18. The sunscreen formulation of claim 1, wherein the carbon quantum dots absorb UVA and UVB radiation.

19. A method of ultraviolet light protection, comprising:
   contacting the sunscreen formulation of claim 1 with skin of a subject;
   irradiating the skin of the subject with the formulation present on the skin,
   wherein the carbon quantum dots absorb the ultraviolet light.

* * * * *